United States Patent [19]

Ross et al.

[11] Patent Number: 4,866,344
[45] Date of Patent: Sep. 12, 1989

[54] HIGH VOLTAGE POWER SUPPLY FOR A MICROWAVE ELECTRON TUBE

[75] Inventors: Randall I. Ross, Pleasanton; Bradley Gunn, Sunnyvale, both of Calif.

[73] Assignee: Varian Associates, Inc., Palo Alto, Calif.

[21] Appl. No.: 237,194

[22] Filed: Aug. 29, 1988

Related U.S. Application Data

[63] Continuation of Ser. No. 909,439, Sep. 19, 1986, Pat. No. 4,777,406.

[51] Int. Cl.$^4$ .......................... H01J 23/34; H01J 25/00
[52] U.S. Cl. .................................... 315/3.5; 315/39.3; 328/261; 330/43
[58] Field of Search ............. 315/3.5, 3.6, 1, 39.3; 328/261; 330/43

[56] References Cited

U.S. PATENT DOCUMENTS

| | | | |
|---|---|---|---|
| Re. 28,782 | 4/1976 | Caldwell et al. | 315/3.5 |
| 3,092,750 | 6/1963 | Haus et al. | 315/3.5 |
| 3,760,219 | 9/1973 | DeSantis et al. | 315/3.5 |
| 4,041,413 | 8/1977 | Strothers, Jr. | 330/43 |
| 4,343,853 | 4/1982 | Kurokawa | 315/3.5 X |
| 4,371,830 | 2/1983 | Loucks | 315/3.5 X |
| 4,374,346 | 2/1983 | Tsuchiya et al. | 315/3.5 X |
| 4,687,970 | 8/1987 | Musslyn et al. | 330/43 |
| 4,709,215 | 11/1987 | McClanahan et al. | 330/43 |
| 4,777,406 | 10/1988 | Ross et al. | 315/3.5 |
| 4,802,688 | 4/1989 | Jasper, Jr. | 505/1 |

Primary Examiner—James J. Groody
Assistant Examiner—Mark R. Powell
Attorney, Agent, or Firm—Stanley Z. Cole; Gerald M. Fisher; Peter J. Sgarbossa

[57] ABSTRACT

A power supply for helix and collector electrodes of a traveling wave tube is driven by an AC power source having a frequency of at least 500 KHz. The helix supply includes plural, stacked voltage double AC to DC modules responsive to the 500 KHz source. The collector supply includes plural AC to DC modules, each having a diode full wave rectifier bridge, connected in stacked relation. Each of the modules includes a transformer with a ferrite, toroidal core dimensioned so that it is not driven into saturation by the 500 KHz source. Each module also includes inexpensive, signal switching diodes having a recovery time of approximately 4 nanoseconds. The ratio of the collector to helix DC voltages is maintained constant by threading a common lead through the apertures of the toroidal cores of the helix and collector modules. A separate common lead threaded through the apertures of the toroidal cores in the collector modules is connected directly to the 500 KHz power source. A feedback circuit responsive to the helix-cathode voltage of the TWT controls the helix power supply voltage precisely.

51 Claims, 4 Drawing Sheets

HIGH VOLTAGE POWER SUPPLY FOR A MICROWAVE ELECTRON TUBE

This is a continuation of application Ser. No. 909,439, now Pat. No. 4,777,406, filed 9/19/86.

TECHNICAL FIELD

The present invention relates generally to high voltage power supplies and more particularly to a high voltage power supply including plural stacked, series rectifier modules, each including a toroidal, ferrite core transformer having a secondary winding driving a diode circuit. In accordance with a further aspect of the invention, a soft power supply maintains a relatively constant ratio for collector and helix electrodes of a traveling wave tube (TWT) by coupling separate rectifiers for the electrodes together. In accordance with another aspect of the invention, a feedback circuit controls a TWT cathode-helix power supply voltage and the ratio of the TWT helix-collector voltage is maintained constant despite the TWT power supply being soft.

BACKGROUND ART

One type of prior art high voltage power supply includes an AC power source having a frequency between 20 and 100 KHz. The source drives a high voltage rectifier including a low voltage primary and a high voltage secondary winding that drives a diode bridge network. The maximum frequency has been confined to approximately 100 KHz because diodes employed in the rectifier are power devices, incapable of recovering adequately if driven at frequencies in excess of 100 KHz. However, because frequencies less than 100 KHz are employed, magnetic core components employed in the transformer are large and heavy. In addition, the magnetic core components are relatively expensive, as are the power diodes employed in the rectifier. These factors concerning size, weight and cost detract from the viability of the prior art high voltage supplies for use in missles and/or airborne systems to energize high voltage electrodes, such as the helix and collector electrodes of a traveling wave tube.

The described prior art high voltage power supplies also are subject to arcing and associated discharge problems, unless appropriate precautions are taken. This occurs even though the high voltage transformers are relatively large. The breakdown problems are likely to occur because ground and high voltage are inside the transformer. To obviate this problem, it has been necessary in the prior art to employ critical and exotic potting techniques and structures.

A further problem with the prior art single power transformer approach is heating due to losses in the power diodes and transformer core. The diodes generally are located in a small volume, where the power and heat dissipated thereby is concentrated. Hence, the heat dissipation problem could be obviated by distributing the diodes over a large surface area.

It is, accordingly, an object of the present invention to provide a new and improved high voltage power supply particularly adapted to supply vacuum tube electrodes.

Another object of the present invention is to provide a new and improved relatively low cost and low volume high voltage power supply for the collector and helix of a traveling wave tube.

Another object of the present invention is to provide a new and improved high voltage DC power supply that achieves low cost and small volume requirements of missles and/or airborne systems through the use of magnetic circuit elements that are operated at frequencies in excess of 100 KHz.

An additional object of the invention is to provide a new and improved high voltage DC power supply employing rectifiers having inexpensive signal switching diodes, instead of expensive power switching diodes.

Still a further object of the invention is to provide a new and improved high voltage DC switched power supply employing switching diodes distributed over a relatively large surface area to avoid heat dissipation problems associated with power diodes located in a relatively small volume.

A further object of the invention is to provide a new and improved high voltage DC power supply employing many transformers distributed over a relatively large surface area to avoid breakdown problems attendant with high voltage power supplies employing a single transformer.

DISCLOSURE OF INVENTION

In accordance with one aspect of the present invention, a new and improved DC high voltage power supply includes plural stacked AC to DC converter or rectifier modules, each of which includes a toroidal, ferrite transformer core through which is threaded a primary winding. A secondary winding wound on each core drives a full wave diode circuit. DC voltages derived by each diode circuit are summed together, as required, to derive the desired DC output voltage. For relatively high power applications, such as a 200 milliamp load of a collector electrode of a traveling wave tube, each full wave diode circuit is constructed as a bridge. For lighter loads, such as a 7 milliampere requirement of a helix electrode of a traveling wave tube, each full wave diode circuit is part of a voltage multiplier, such as a voltage doubler.

Diode elements in the diode circuit are high speed, low cost signal switching diodes having recovery times no greater than about 4 nanoseconds. These very high speed diodes enable the primary windings to be driven at frequencies of approximately at least 500 KHz. The 500 KHz drive for the primary windings in turn enables toroidal, ferrite cores to be used. For lower frequencies, the toroidal ferrites would be driven into saturation. However, core saturation is avoided by driving the toroidal ferrite cores with an AC power source having a frequency of at least 500 KHz via a low inductance primary winding, e.g. a single turn primary. Thus, the power source has at least a predetermined frequency that drives toroidal, ferrite cores dimensioned so they are not saturated and the diodes have recovery times that are very small percentages of one period of the frequency.

The multiple toroidal ferrite cores, each having a single turn primary winding and a multi-turn secondary, avoid the prior art breakdown problem. This is because a relatively low voltage (e.g. about 750 volts DC) is maintained across the secondary winding of each transformer. The plural rectifier modules are located at spaced locations on a printed circuit board, so heat generated by each rectifier circuit is distributed over a large surface area. The physical size and weight of a power supply made in accordance with the present invention are quite small because small ferrite, toroidal cores are mounted on a single printed circuit board and arranged so that a wire extends through them to form the single turn primary. Rectifier diodes and passive elements, such as resistors and/or capacitors, are mounted on the printed circuit board in an orderly, modular manner to provide a small volume that is distributed over a significant area for heat dissipation purposes.

In the preferred use of the device, DC excitation voltages for cathode, collector and helix electrodes of a traveling wave tube are derived. A relatively low voltage DC power source drives a bridge switching network having a variable duty cycle controlled via a feedback loop by the electrode load requirements, as indicated by the helix-cathode voltage. The diode switching bridge includes a resonant circuit, connected to drive the single turn primary windings of the various modules at a frequency in excess of 500 KHz. The collector electrode of the traveling wave tube is connected to an output voltage derived from modules arranged so plural full wave diode bridge circuits are connected in a stacked, series relation. The helix electrode of the traveling wave tube is connected to an output voltage derived from modules arranged so plural full wave diode voltage doublers are connected in a stacked, series relation with each other.

The resonant frequency of the resonant circuit determines the drive frequency of the rectifier modules. The inductance of the resonant drive circuit includes the fixed inductance of an inductor in the drive circuit and the inductance of leakage reactances coupled to the single turn primary windings. The leakage inductance of the different modules isolates each stage so that if all of the diode elements of a particular module become short-circuited, the output voltage of the driver circuit only drops slightly. The relatively high leakage inductance, however, causes the high voltage output of the supply to be relatively soft, i.e., quite load current dependent. This dependency, however, is obviated through the use of the feedback network which controls the duty cycle of the switching bridge output to maintain the helix-cathode voltage constant.

In accordance with a further feature of the invention, the ratio of the helix to collector high voltage electrode voltages (the TWT depression ratio) is maintained constant, despite the "soft" nature of the power supply. It is known that the depression ratio must be maintained constant for optimum traveling wave tube operation. In the present invention, the depression ratio is maintained constant in a facile and inexpensive manner by inductively coupling the lead for the single turn primary winding for the helix high voltage modules to the transformers of the collector high voltage modules. The lead is threaded through the ferrite, toroidal cores of the helix and collector modules. A common lead threaded through the ferrite, toroidal cores of the collector modules is connected in series with the resonant circuit. The leads are threaded so the voltage supplied to each helix module follows the voltage supplied to each collector module to maintain a constant depression ratio. It is to be understood that the depression ratio may be maintained constant in any soft TWT power supply by inductively coupling transformers in helix and collector AC to DC converters to each other, in accordance with this basic concept.

It is, accordingly, a further object of the invention to provide a new and improved traveling wave tube power supply having a soft output and compensation circuitry to maintain depression ratio constant in an inexpensive and simple manner.

The above and still further objects, features and advantages of the present invention will become apparent upon consideration of the following detailed description of several specific embodiments thereof, especially when taken in conjunction with the accompanying drawings.

BEST MODE FOR CARRYING OUT THE INVENTION

Figure 1:
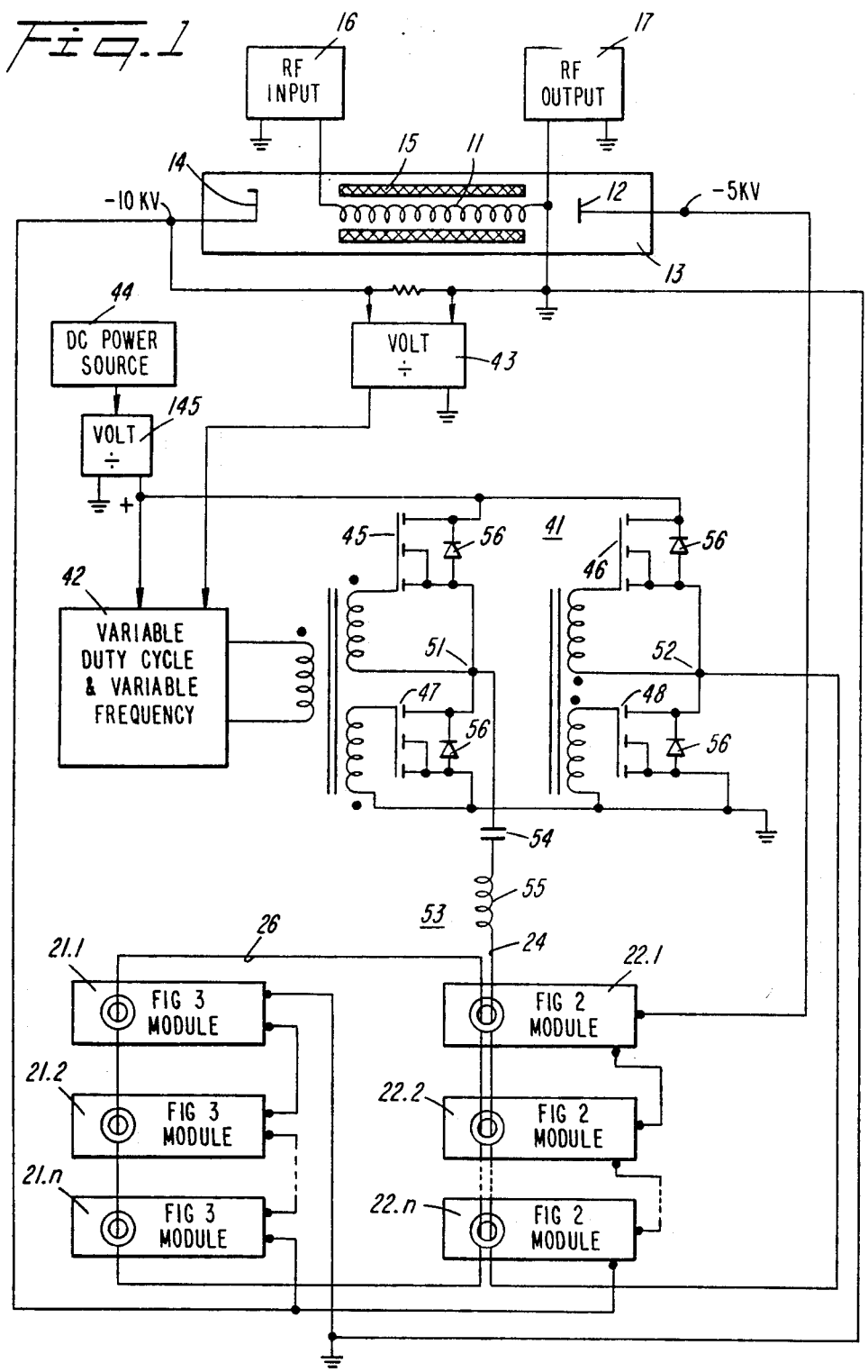
FIG. 1 is a circuit diagram of a preferred embodiment of the invention wherein plural diode modules are connected to drive a collector electrode of a traveling wave tube and plural voltage doubler modules are connected to drive a helix electrode of a traveling wave tube.

Reference is now made to FIG. 1 of the drawing wherein the present invention is illustrated in connection with a power supply for helix electrode 11 and collector electrode 12 of TWT 13 having cathode 14 and coil 15. Helix 11 includes RF input and output electrodes, respectively connected to RF input 17 and RF output 18. The stated elements within traveling wave tube 13 and the connections thereto are conventional, except for the connections for the power supplies of helix 11 and collector 12; thereby, no further description of traveling wave tube 13 and the elements associated therewith is necessary.

Helix 11 and collector 12 are tyically operated at relatively high DC voltages of several thousand volts relative to cathode 14 and have different current demands. In one tube type, cathode 14 is at $-10$ KV, collector 12 at $-5$ KV and helix 11 is grounded; the helix and collector respectively draw approximately 7 milliamperes and 200 milliamperes. Different tube types have different voltage and current requirements for electrodes 11 and 12 which are easily satisfied on a semi-custom basis by the structure of the present invention.

The power supply for helix electrode 11 includes plural identical AC to DC converter modules 21.1, 21.2, ... 21.n, each of which derives a DC output voltage of approximately 1000 volts. The DC output voltages of modules 21 are connected in series with each other so they can be considered as "stacked". The number of modules 21 that are stacked together is dependent upon the voltage requirements of helix electrode 11 relative to cathode 14. Similarly, the high voltage supply for collector electrode 12 includes plural identical stacked AC to DC converter modules 22.1, 22.2, ... 22.n, each of which derives a DC voltage of about 500 volts. Modules 22 have plural stacked, series connected outputs so the number of stacked modules 22 depends on the voltage requirements of collector 12. Typically, each of modules 21 includes a voltage doubler full wave rectifier stage, while each of modules 22 includes a diode bridge rectifier, whereby the output voltages of modules 21 are greater than those of modules 22, but the current outputs of modules 22 considerably exceed those of modules 21. The stacked output voltages of modules 22 are connected between collector 12 and cathode 14, typically maintained at −5 KV and −10 KV, respectively. The stacked DC output voltages of modules 21 are connected between grounded helix 11 and cathode 14. Circuit diagrams for modules 21 and 22 and the connections between the modules for exemplary situations are illustrated in FIGS. 3 and 2, respectively.

Figure 2:
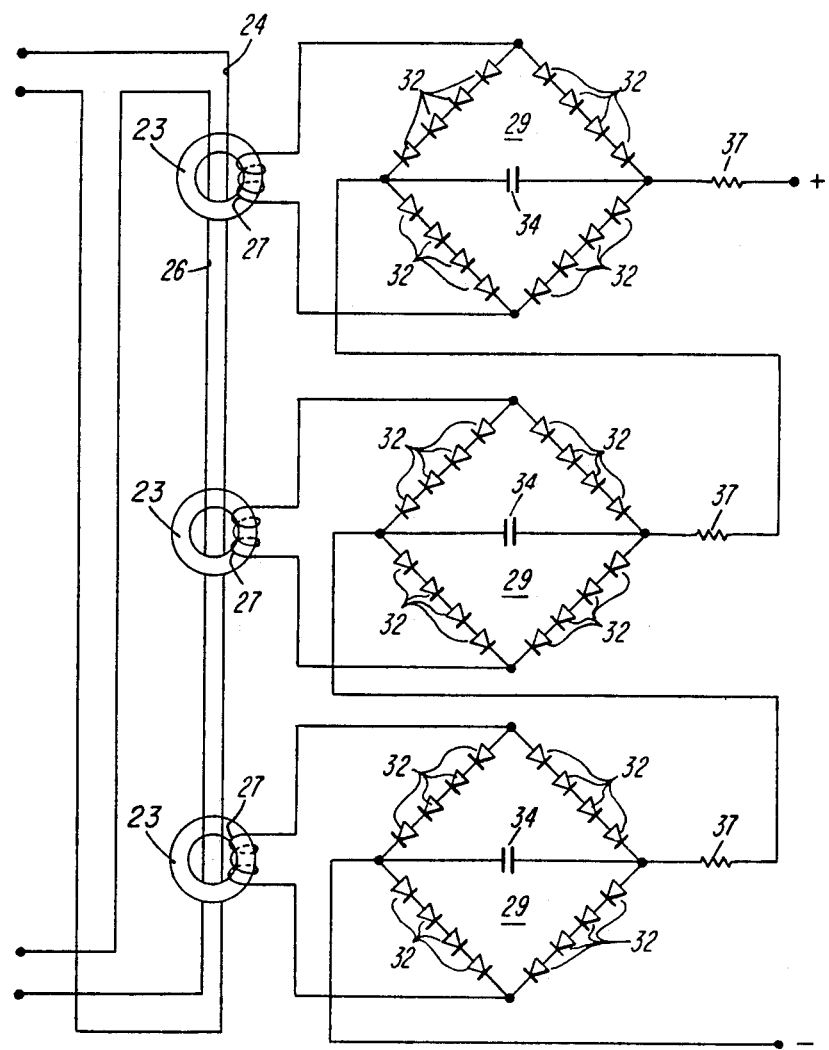
FIG. 2 is a circuit diagram of a module including a diode bridge rectifier.
Figure 3:
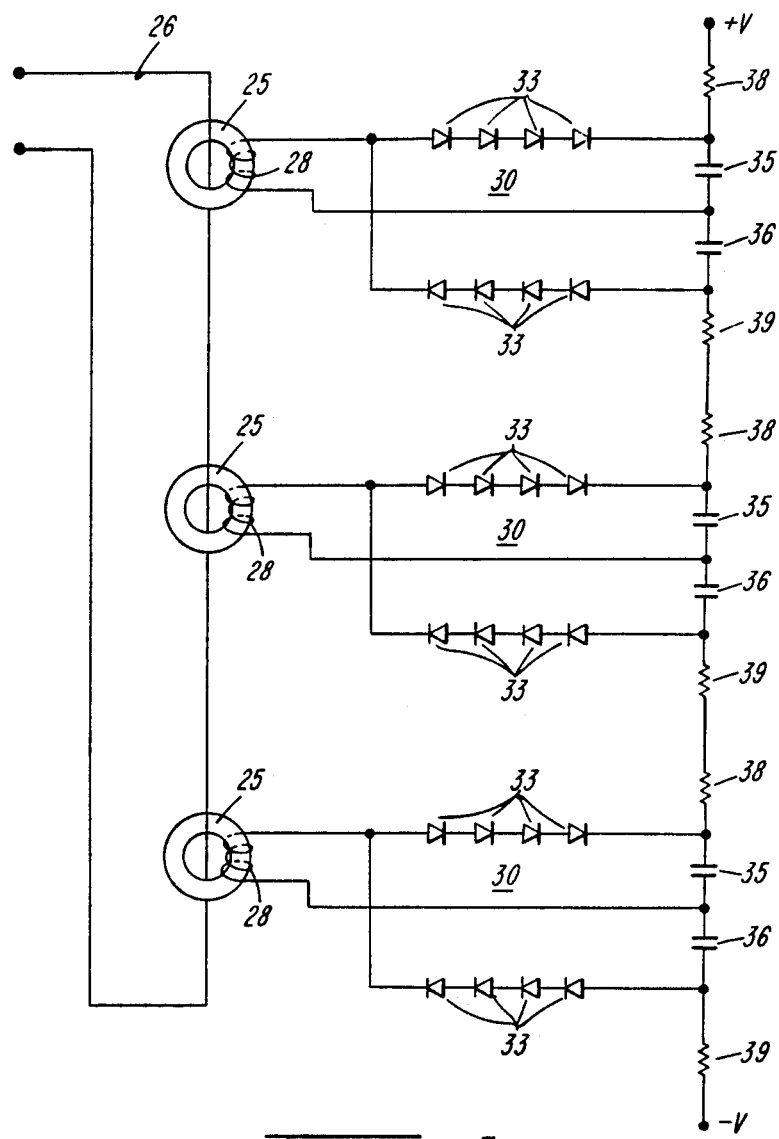
FIG. 3 is a circuit diagram of a module including a voltage doubler.

As illustrated in FIG. 2, each of modules 22 includes a transformer with a ferrite, toroidal core 23 having a single turn primary winding; the same single magnetic lead wire 24 is threaded as a single turn winding through the aperture of each of cores 23. Similarly, as illustrated in FIG. 3, each of modules 21 includes a transformer with a toroidal, ferrite core 25; a single magnetic lead wire 26 is threaded as a single turn winding through each of cores 25. Cores 23 and 25 have small cross-sections so they are not driven into a lossey saturation state in response to AC voltages having frequencies of at least 500 KHz.

Multi-turn secondary windings 27 and 28 are respectively wound on each of cores 23 and 25. Windings 27 and 28 respectively drive full wave diode bridges 29 and voltage doubler circuits 30. Each of bridges 29 and voltage doublers 30 respectively includes full wave rectifying diodes 32 and 33. Diodes 32 and 33 are preferably inexpensive relatively low voltage, low current signal switching elements having high frequency capability with recovery times of no more than 3–4 nanoseconds, such as IN4148 diodes which have voltage ratings of approximately 125 volts. To obtain the higher voltage rating required across each leg of diode bridges 29 and voltage doubler circuits 30, four diodes 32 and 33 are respectively connected in series with each other in the bridge and doubler. Filter and ripple suppressing capacitors 34 are connected between one pair of diagonal terminals of each of bridges 29. Voltage doubler capacitors 35 and 36, which also provide filtering and ripple suppression, are connected between series arms of voltage doublers 30.

A DC output voltage equal approximately to the 500 volts AC voltage applied to the diagonal input terminals of each of bridges 29 is developed across the diagonal output terminal of each of bridges. Resistor 37 is connected in series with one diagonal output terminal of each of bridges 29 for current limiting purposes. Each of voltage doublers 30 derives a DC output voltage across the series combination of capacitors 35 and 36; this DC voltage is equal approximately to twice the AC voltage applied to secondary winding 28 of each of cores 23. The DC voltage developed across capacitors 35 and 36 is limited by current limiting resistors 38 and 39, respectively connected to opposite electrodes of capacitors 35 and 36.

Thus, each of modules 21 includes toroidal, ferrite core 25, the single turn primary and multi-turn secondary windings thereof, as well as eight diodes 33, capacitors 35, 36 and resistors 38, 39. Each of modules 22 includes toroidal, ferrite core 23 and windings 24 and 27 thereof, in combination with sixteen diodes 32, capacitor 34 and resistor 37. A single wire 24 threads through each of cores 27, while a single wire 26 threads through each of cores 25. In some instances, wires 24 and 26 may be the same wire that is connected to a 500 KHz source, although for the preferred embodiment this is not the case.

In the preferred embodiment the voltage ratio between collector 12 and helix 11 relative to cathode 14 is maintained approximately constant (e.g. to within 5%) by threading lead wire 26 through cores 23 so the voltages supplied to modules 21 go up and down as the voltages supplied to modules go up and down. The ratio of the input voltages to modules 21 and 22 is maintained relatively constant despite the soft nature of the power supplies for electrodes 11 and 12 because of the inductive coupling provided by cores 23 to leads 24 and 26 and the close proximity of these leads as they thread through cores 23. This depression ratio control circuitry in combination with feedback control circuitry (described infra) for the helix-cathode voltage enables precise TWT electrode control over a wide range of load conditions.

The diagonal output terminals of bridges 29 are connected in series with each other so that opposite polarity terminals of adjacent bridges are connected to each other by way of a current limiting resistor 37 to provide the power supply voltage for collector 12 relative to cathode 14. The DC output voltages of modules 21 are connected in series, in stacked relationship with each other, to provide the power supply voltage of collector 12 relative to cathode 14 by connecting opposite DC output terminals of adjacent pairs of the modules in series with each other by way of current limiting resistors 38 and 39.

Because each of modules 21 and 22 includes a small cross-section toroidal, ferrite core transformer and high speed switching diodes having recovery times of approximately 3–4 nanoseconds, the modules can be driven by high frequency excitation voltages of 500 KHz or more without saturating the cores; this reduces core heat losses and spreads the diode dissipation losses over a large surface area. To these ends, as illustrated in FIG. 1, wire 24 that is threaded through cores 23 of modules 22 is connected in series with a series resonant circuit of field effect transistor (FET) switched bridge circuit 41. Switched bridge circuit 41 is in turn driven by variable frequency, variable duty cycle voltage controlled oscillator 42, having a feedback input responsive to the helix-cathode voltage of TWT 13, as coupled to the oscillator by way of voltage divider 43. Bridge 41 and oscillator 42 are connected to DC power source 44, typically having an output voltage of 28 or 280 volts DC. For power sources 44 having an output voltage of 280 volts, voltage divider 45 is connected between the power source and a DC power input terminal of oscillator 42.

The input signal to oscillator 42 from voltage divider 43 controls the frequency and duty cycle of voltage controlled oscillator 42. The frequency of oscillator 42 is variable between 100 and 150 KHz. The waveform derived by oscillator 42 includes, for each cycle, a positive fixed duration portion, followed by a variable dead time, followed by a fixed negative duration portion. The variable dead time is controlled by the magnitude of the voltage applied by divider 43 to oscillator 42, thereby to control the duty cycle and frequency of oscillator 42 in a known manner. Typically, the fixed duration positive and negative intervals are 400 nanoseconds.

The variable duty, variable frequency output of oscillator 42 is supplied as a switching control to bridge 41. Bridge 41 includes field effect transistors 45–48 (FET's) having emitter collector paths that are connected to each other and across the output terminals of voltage divider 145. FET's 45–48 include control electrodes connected to the output of oscillator 42 in such a manner that during intervals while the output of oscillator 42 is positive the source drain paths of FET's 45 and 48 are forward-biased to the exclusion of FET's 46 and 47; during intervals while oscillator 42 is deriving a negative output the source drain paths of FET's 46 and 47 are forward-biased to the exclusion of FET's 45 and 48. Common terminal 51 for the source and drain of FET's 45 and 47 is connected to one end terminal of tank circuit 53, having a second end terminal connected to common terminal 52 for the source and drain of FET's 46 and 48.

Tank circuit 53 includes capacitor 54, connected in series with inductor 55, in turn connected to wire 24 that threads through toroids 23 of modules 22. The resonant frequency of tank circuit 53 is determined by the capacitance of capacitor 54 and the inductance of inductor 55, in combination with the distributed reactances coupled by all of modules 21 and 22 to wire 24 by way of toroids 23. Thus, damped sinusoidal waves are derived by switched bridge circuit 41 during each positive and negative output of oscillator 42; the damped sinusoids have a frequency of at least 500 KHz determined by the resonant frequency of the series combination of capacitor 54, inductance 55 and the distributed reactance coupled to wire 24. Harmonics of the selected frequency are also generated by virtue of the switching action of bridge 41.

After each positive or negative output of oscillator 42 residual energy exists in the inductance of tank circuit 53. The back EMF resulting from the residual energy causes current to flow through diodes 56 shunting the source drain paths of the FET's that were forward-biased during the immediately preceding activation period of oscillator 42. Thus, for example, if FET's 45 and 48 are in a forward-biased condition in response to a positive output of oscillator 42, the back EMF produced by tank circuit 53 flows through the diodes shunting the source drain paths of FET's 45 and 48 when the output of oscillator 42 goes from positive to a zero value during the dead time. The output of bridge 41, as applied to modules 22, includes a first series of sine waves having a fixed frequency determined by the resonant frequency of tank circuit 53, followed by a variable dead time, followed by a second series of sine waves having a frequency determined by the resonant frequency of tank circuit 53. The relative polarity of the first half cycle of the sine waves in the first and second series are reversed because FET's 45 and 48 are activated while the first series of sine waves is derived, and FET's 46 and 47 are activated while the second series of sine waves is derived.

The length of the dead time in the output of oscillator 42, determined by the helix-cathode voltage of TWT 13, controls the magnitude of the voltage applied between helix 11 and cathode 14 to close tolerances, e.g., within plus or minus 0.1%. The voltage ratio from cathode 14 to collector 12 and from the cathode to helix 11 is also controlled by the inductive coupling between cores 23 and 25, typically to within about 5%.

The power supplies for helix 11 and collector 12 are considered as "soft" power supplies, whereby the output voltages of stacked modules 21 and 22 have a tendency to change appreciably as a function of load current. The soft nature of the power supplies for helix 11 and collector 12 makes it difficult to control the ratio of the voltage of helix 11 to collector 12 relative to the voltage of cathode 14 (the TWT depression ratio), unless compensating structure is employed. To maintain the depression ratio of TWT 13 constant, i.e., to maintain the ratio of the voltages of helix 11 to collector 12 constant relative to cathode 14, wire 26 is threaded through each of the toroids 23 of modules 22. This simple arrangement enables the helix and collector voltages to be tied to each other so that as the voltage supplied to collector modules 22 from bridge 41 increases and decreases there are corresponding and proportional increases and decreases in the voltages supplied to modules 21 because of the inductive coupling between wires 24 and 26 via toroidal cores 23. Because helix 11 does not draw much current there is little voltage sag and a constant voltage ratio for the helix 11 and collector 12 is maintained.

Figure 4:
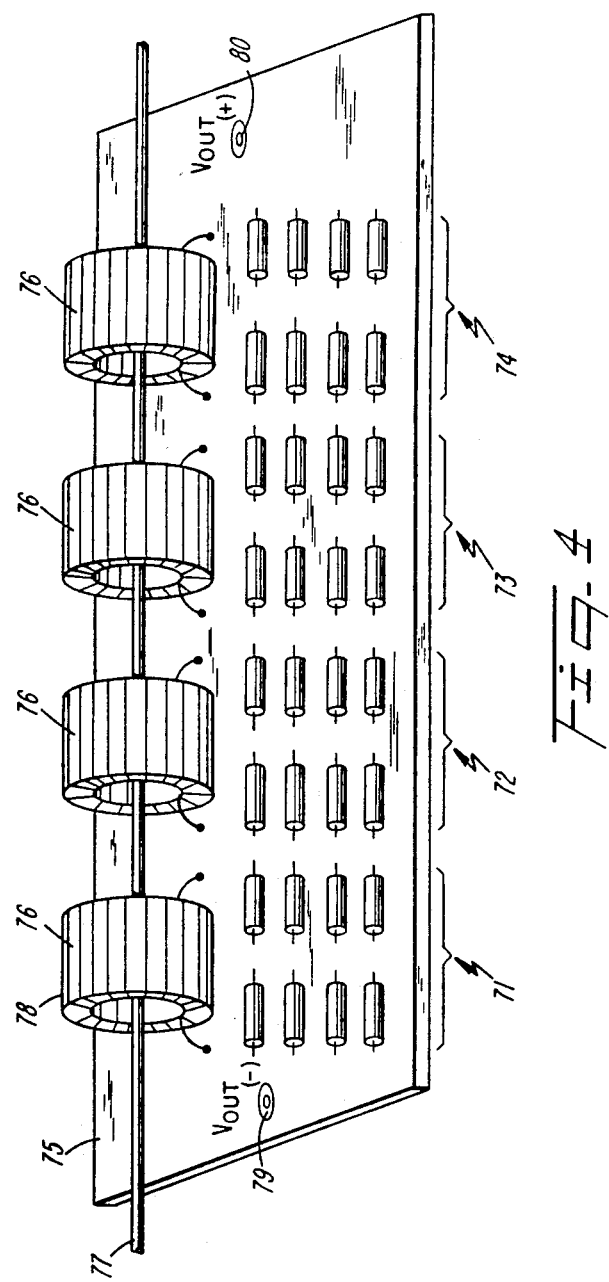
FIG. 4 is a perspective view of the mechanical construction of the present invention.

Reference is now made to FIG. 4 of the drawing wherein there is illustrated a perspective view of the mechanical construction of four high voltage helix modules 71–74 in accordance with the present invention. Modules 71–74 are basically mounted on dielectric printed circuit board 75, so that the modules are positioned along the length of the printed circuit board. Each of modules 71–74 includes a ferrite toroidal core 76. Cores 76 are mounted on printed circuit board 75 so that a cylindrical side wall of each core abuts against the printed circuit board and the axes of the toroidal cores are aligned parallel to the plane of the board. Magnetic wire 77 is threaded through the center aperture of each of cores 76 so it is coincident with the aligned axes of the cores, to serve as a common primary winding for all of the four transformers including the four cores. Wound on each of cores 76 is a separate multi-turn secondary winding 78, having end terminals that are connected to conductors (not shown) on printed circuit board 75.

Each of modules 71–74 includes diodes, resistors and capacitors. The diodes, resistors and capacitors for each of modules 71–74 are located on printed circuit board 75 at a position between cores 76 and a longitudinal edge of the printed circuit board that lies parallel to the common longitudinal axes of the cores. The diodes, resistors and capacitors of each of modules 71–74 are connected to each other and to secondary winding 76 by leads (not shown) on the printed circuit board. Similar, adjacent modules have high voltage terminals that are connected to each other via leads (not shown) on the printed circuit board. Modules 71 and 74 have leads respectively connected to minus and plus high voltage terminals 79 and 80, at opposite ends of printed circuit board 75, in proximity to the edges of the printed circuit board that are at right angles to the aligned longitudinal axes of cores 76.

Any number of units, as required, similar to those illustrated in FIG. 4, can be mounted on a particular circuit board. Alternatively, different similar circuit boards can be abutted against each other and connected by an appropriate jumper lead to obtain the desired high voltage.

The construction of FIG. 4 is particularly advantageous because a relatively low voltage is developed in each module. This, to a large extent, reduces problems of arcing in a particular module and between modules. Heat is distributed evenly over a relatively large surface area. Because toroidal, ferrite cores 76 have a small cross-sectional area and are driven by an AC voltage having a frequency of about at least 500 KHz applied to lead 77, the cores are not driven into saturation.

The construction of several collector electrode power supply modules is essentially the same as that illustrated for the helix modules. However, in the collector modules, two magnetic wires are threaded through the toroidal cores and are displaced equally from the common longitudinal axes of the cores. The same advantages of heat dissipation and low probability of high voltage arcing are provided with multiple collector electrode modules constructed in this manner.

While there have been described and illustrated several specific embodiments of the invention, it will be clear that variations in the details of the embodiments specifically illustrated and described may be made without departing from the true spirit and scope of the invention as defined in the appended claims. For example, different combinations of series and parallel connections can be provided between the collector and helix modules, as well as the resonant drive circuit.

We claim:

1. A DC high voltage power supply for at least one high voltage electrode of a microwave electron tube, said supply being adapted to be energized by a source, comprising means responsive to the source for deriving an AC voltage having a frequency at least in the 100 kiloHertz range, voltage converter means responsive to the AC voltage for deriving the DC high voltage, the voltage converter means including plural switching series connected diodes, each of said diodes having a recovery time that is a very small fraction of a cycle of the frequency of the AC voltage.

2. The power supply of claim 1 wherein the frequency of the AC voltage is in the hundreds of kiloHertz range.

3. The power supply of claim 2 wherein the very small fraction is less than 0.5 per cent.

4. The power supply of claim 2 wherein the very small fraction is about 0.2 per cent.

5. The power supply of claim 2 wherein the recovery time is about 4 nanoseconds.

6. The power supply of claim 1 wherein the very small fraction is less than 0.5 per cent.

7. The power supply of claim 1 wherein the very small fraction is about 0.2 per cent.

8. The power supply of claim 1 wherein the recovery time is about 4 nanoseconds.

9. The power supply of claim 1 wherein the diodes are type 1N4148.

10. The power supply of claim 1 wherein the diodes are connected to each other so the same current flows through each of them.

11. The power supply of claim 1 wherein the AC voltage deriving means includes a series resonant circuit having a resonant frequency determining the frequency of the AC voltage, and switch means for supplying current derived from the source to the series resonant circuit, and means for coupling current from the series resonant circuit to said voltage converter means.

12. In combination, a microwave electron tube having a high voltage electrode, a DC voltage power supply for said electrode, said power supply being energized by a relatively low frequency AC source and including means responsive to the source for deriving an AC voltage having a frequency at least in the 100 kiloHertz range, voltage converter means responsive to the AC voltage for deriving the DC high voltage, the voltage converter means including plural switching series connected diodes, each of said diodes having a recovery time that is a very small fraction of a cycle of the frequency of the AC voltage.

13. The combination of claim 12 wherein the voltage converter means includes a voltage multiplier.

14. The combination of claim 13 wherein the voltage multiplier includes plural strings of said series connected diodes.

15. The combination of claim 14 wherein the diodes of one of said strings are poled to pass current of one polarity from the AC source, the diodes of another of said strings being poled to pass current of a second polarity from the AC source.

16. The combination of claim 1 wherein the diodes of the first and second strings supply current to first and second terminals of the voltage multiplier, impedance means for connecting said first and second terminal in series with each other.

17. The combination of claim 12 wherein the voltage converter means includes a diode rectifier bridge having plural arms, each with a string of said series connected diodes.

18. The combination of claim 17 wherein the diodes of one of said strings are poled to pass current of one polarity from the AC source, the diodes of another of said strings being poled to pass current of a second polarity from the AC source.

19. The combination of claim 12 wherein the voltage converter includes plural strings of said series connected diodes.

20. The combination of claim 19 wherein the diodes of one of said strings are poled to pass current of one polarity from the AC source, the diodes of another of said strings being poled to pass current of a second polarity from the AC source.

21. A power supply for a travelling wave tube having cathode, collector and helix electrodes comprising an AC source, converter means connected to be energized by the AC source for deriving DC energizing voltages for the helix and collector electrodes relative to the cathode electrode, and means responsive to the cathode helix voltage difference for controlling the voltage between the collector and cathode electrodes and the voltage between the helix and cathode electrodes, said converter means including plural series connected switching diodes each having a recovery time that is a very small fraction of the time of one cycle of the AC source.

22. The power supply of claim 21 wherein the AC source derives a frequency of at least 100 kiloHertz.

23. The power supply of claim 22 wherein the very small fraction is less than 0.5 per cent.

24. The power supply of claim 22 wherein the very small fraction is about 0.2 per cent.

25. The power supply of claim 22 wherein the recovery time is about 4 nanoseconds.

26. The power supply of claim 21 wherein the very small fraction is less than 0.5 per cent.

27. The power supply of claim 21 wherein the very small fraction is about 0.2 per cent.

28. The power supply of claim 21 wherein the recovery time is about 4 nanoseconds.

29. The power supply of claim 21 wherein the diodes are type 1N4148.

30. A DC high voltage power supply for an electron tube having plural electrodes at least one of which requires a high DC energizing voltage, comprising switch means connected with a series resonant circuit and a power source, means responsive to the voltage of at least one high voltage electrode of said tube for controlling the opening and closing of said switch means and the flow of current from the power source to the resonant circuit, the frequency of the resonant circuit and the length of time said switch is closed being such that at least several cycles of current flow in the resonant circuit at a frequency determined by the resonant circuit frequency each time the switch is closed, and AC to DC converter means connected to be responsive to current flowing in said resonant circuit for deriving the high DC energizing voltage for said one electrode, said converter means including plural series connected diodes poled to supply current in only one direction between said resonant circuit and said one electrode.

31. The power supply of claim 30 wherein the converter includes a plurality of series connected diodes poled to supply current in only a second direction between said resonant circuit and said one electrode.

32. The power supply of claim 31 wherein each of the diodes is a switching diode having a recovery time that is a small fraction of one cycle of the frequency of current flowing in the resonant circuit.

33. The power supply of claim 32 wherein the current flowing in the resonant circuit has a frequency of at least 100 kiloHertz.

34. The power supply of claim 33 wherein the very small fraction is less than 0.5 per cent.

35. The power supply of claim 33 wherein the very small fraction is about 0.2 per cent.

36. The power supply of claim 33 wherein the recovery time is about 4 nanoseconds.

37. The power supply of claim 33 wherein the very small fraction is less than 0.5 per cent.

38. The power supply of claim 32 wherein the very small fraction is about 0.2 per cent.

39. The power supply of claim 32 wherein the recovery time is about 4 nanoseconds.

40. The power supply of claim 32 wherein the diodes are type 1N4148.

41. A power supply for a microwave electron tube having first, second and third electrodes comprising an AC source responsive to a DC power supply voltage, a converter for connecting AC voltage derived from said source into DC voltages for said electrodes, said converter including: first rectifying means for supplying to said first electrode a first DC voltage relative to said third electrode and second rectifying means for supplying to said second electrode a second DC voltage relative to said third electrode, means responsive to the DC voltage between a pair of said electrodes for controlling the converter means to vary the DC voltage supplied between the first and third electrodes, and means for coupling the first and second rectifying means being together so the voltage between the first and third electrodes varies relative to the DC voltage supplied between the second and third electrodes.

42. The power supply of claim 30 wherein the means for coupling includes means for maintaining the ratio of the DC voltage between the first and third electrodes to the DC voltage between the second and third electrodes approximately constant for varying values of the DC voltage between said pair of said electrodes.

43. The power supply of claim 42 wherein each of said first and second rectifiers includes plural series connected switching diodes poled so current flows through them in a single direction, said switching diodes having a recovery time that is a small fraction of one cycle of the frequency of current flowing from the AC source to the converter.

44. The power supply of claim 42 wherein the frequency of the AC voltage is at least 100 kiloHertz.

45. The power supply of claim 44 wherein the very small fraction is less than 0.5 per cent.

46. The power supply of claim 44 wherein the very small fraction is about 0.2 per cent.

47. The power supply of claim 44 wherein the recovery time is about 4 nanoseconds.

48. The power supply of claim 44 wherein the very small fraction is less than 0.5 per cent.

49. The power supply of claim 44 wherein the very small fraction is about 0.2 per cent.

50. The power supply of claim 44 wherein the recovery time is about 4 nanoseconds.

51. The power supply of claim 44 wherein the diodes are type 1N4148.

* * * * *

Disclaimer 4,866,344.—*Randall I. Ross*, Pleasanton; *Bradley Gunn*, Sunnyvale, both of Calif. HIGH VOLTAGE POWER SUPPLY FOR A MICROWAVE ELECTRON TUBE. Patent dated Sept. 12, 1989. Disclaimer filed Nov. 17, 1989, by the assignee, Varian Associates, Inc.

The term of this patent subsequent to October 11, 2005, has been disclaimed.
*[Official Gazette May 15, 1990]*